May 22, 1945.  E. G. RATZ  2,376,808
TRANSFORMER DIFFERENTIAL RELAY
Filed May 7, 1943
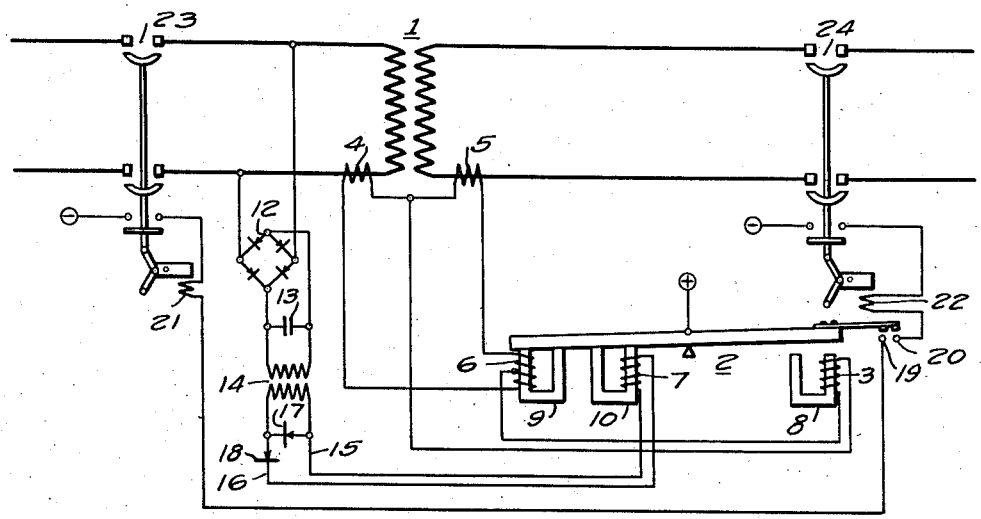
WITNESSES:
INVENTOR
Elmer G. Ratz.
BY
ATTORNEY Patented May 22, 1945

2,376,808

UNITED STATES PATENT OFFICE 2,376,808

TRANSFORMER DIFFERENTIAL RELAY

Elmer G. Ratz, Hamilton, Ontario, Canada, assignor to Westinghouse Electric & Manufacturing Company, East Pittsburgh, Pa., a corporation of Pennsylvania Application May 7, 1943, Serial No. 436,016

15 Claims. (Cl. 175—294)

My invention relates to protective relaying equipment for an alternating-current electrical apparatus of a type which is subject to transient fault-simulating conditions when the apparatus is unfaulted, and it has particular relation to differential transformer protective systems and to fault-responsive relays having transient restraint-means for compensating for the fault-simulating effect in the protected apparatus, as in the case of the magnetizing-current inrush of differentially protected power-transformers.

An object of my invention is to make a transformer differential relay, or similar device, less sensitive to the magnetizing inrush which occurs at the moment of energization of a dead transformer. This magnetizing inrush is a current which is fed into the transformer from the energized side, but is not balanced by an equivalent current leaving the transformer on the output side. In accordance with my invention, I provide a supplemental restraining-means which develops a restraining force in the relay, having a time-characteristic which may be similar to the magnetizing-current inrush-characteristic of the protected transformer, thus restraining the relay in an amount, and for a time, which approximately corresponds to the fault-simulating effect of the magnetizing-current inrush.

A more specific object of my invention is to provide a transiently operative suppressor-means for rendering a differential relay relatively ineffective in response to the rate of change of a rectified voltage of the protected transformer, and more particularly, to this rate of change only when it is in a direction corresponding to a sudden increase in the transformer-voltage, so that the differential relay will not be restrained in the event of an internal fault which would result in a sudden decrease in the transformer-voltage at the time when voltage is already applied to the transformer, when the transformer is in normal operation.

With the foregoing and other objects in view, my invention consists in the circuits, apparatus, relays, relay-systems, and methods, hereinafter described and claimed, and illustrated in the accompanying drawing, the single figure of which is a diagrammatic view of circuits and apparatus embodying my invention.

I have illustrated my invention as applied to the differential protection of a single-phase power-transformer 1, although it is to be understood that the invention is equally applicable to the protection of polyphase transformers, and certain aspects of my invention are also of general application to the protection, whether differential or otherwise, of any alternating-current electrical apparatus of a type which is subject to transient fault-simulating conditions when the apparatus is first energized, even though there is actually no fault within the apparatus.

A suitable fault-responsive relay is provided for responding to faults within the protected apparatus, and in the illustrated form of my invention, I have shown a ratio-differential relay 2 for this purpose, having an operating coil or winding 3, which is responsive to the difference between the input and output currents of the protected transformer 1, as derived by two line-current transformers 4 and 5. In order to give the differential relay 2 a percentage or ratio characteristic, it may be provided, as shown, with a restraining-winding 6, which is energized in response to the sum of the two currents in the primary and secondary circuits of the protected transformer 1, in a manner which is well known in the art, although my invention is not limited to differential relays having this particular restraint-characteristic.

In accordance with my invention, I provide a supplemental restraint-winding 7 which is only transiently energized, in response to a transient in the average or root-mean-square value of the voltage which is applied to, or appears on, the protected transformer 1. In the particular illustrated form of my invention, the three relay-windings 3, 6 and 7 are each disposed on a separate magnetic circuit, as indicated at 8, 9 and 10, respectively, although other arrangements may be provided.

For energizing the transiently operating restraint-winding 7, I utilize a voltage-responsive rectifying-means, preferably of the full-wave type, as indicated by a rectifier-bridge 12 which is energized from the voltage appearing across one terminal of the protected transformer 1. In some cases, the rectified-voltage output of the rectifier-bridge 12 may be smoothed out, in waveshape, by any suitable means, such as a capacitor 13 connected across the output-terminals of the rectifier-bridge, so as to substantially smooth out the ripples in the rectified voltage-wave. I do this, because my object is not to respond to the ripples in the rectified voltage or current, but to respond to a sudden change in the magnitude of the rectified voltage, such as is obtained when the alternating-current voltage of the protected transformer 1 is suddenly changed.

In accordance with my invention, any suitable means, which may conveniently be some form of reactance-means, is utilized to segregate a voltage which is responsive to sudden changes in the magnitude of the transformer-voltage of the protected transformer 1. To this end, I have illustrated a magnetic coupling-device 14, which may be an iron-core transformer or reactor, either with or without an air-gap, which is energized from the rectifier-bridge 12, and which delivers its segregated voltage to a restraint-winding circuit 15—16 which energizes the restraint-winding 7. In this way, the restraint-winding 7 receives current, only when the rectified-voltage output of the voltage-energized rectifier 12 changes in magnitude, in response to changes in the magnitude of the alternating-current voltage which appears across the terminals of the protected transformer 1. This restraining-winding energizing-means may be designed to have a characteristic of the same general type as the magnetizing-current inrush-characteristic of the protected transformer, so that a compensating restraining-force may be provided in the differential relay 2, in an amount which is of approximately just the correct magnitude to compensate for the fault-simulating effect of the magnetizing-current inrush in the protected transformer 1, said restraining force also having a decrement which also approximately corresponds to the decrement in the magnetizing-current inrush, so that approximately correct compensation is provided, both in respect to amount, and in respect to the time of the transient.

In all magnetizing-inrush suppressors for transformer differential relays, the problem always exists, to avoid desensitizing the relay, or rendering it relatively ineffective, in response to sudden voltage-dips in the transformer-voltage, when an internal fault occurs within the protected transformer at a time when the transformer is energized or in normal service. In such a case, since there is an internal fault within the transformer itself, it is most undesirable for the transformer differential relay to be restrained or rendered ineffective because, under such conditions, the internal fault may be only a light fault, requiring maximum sensitivity in the operation of the relay; and this has heretofore constituted a very considerable problem in connection with previous attempts to desensitize or restrain or lock out the differential relay in response to sudden changes in the magnitude of the transformer-voltage.

It is an important feature of my invention, therefore, that it readily lends itself to the provision of effective means for providing a polarity-selecting rectifying-means, or other polarity-selective means, for causing the restraint-winding 7 to develop a stronger restraining-force when the segregated-voltage output of the magnetic coupling-device 14 has a polarity corresponding to an increase in the power-transformer voltage, than when said segregated voltage has the opposite polarity. As an illustration of typical means for effecting this polarity-selective purpose, I have shown a rectifier 17, connected across the output-terminals of the segregated-voltage coupling-device 14, and another rectifier 18 in series with the restraint-winding 7, so that, when the rectified-voltage output of the voltage-responsive rectifier 12 suddenly increases, the amount of increase is reflected in the coupling-device 14 and is delivered, as a unidirectional pulsation of current passing through the rectifier 18, to the restraint-winding 7. On the other hand, when the line-voltage suddenly decreases, the amount of decrement in the rectified-voltage output of the voltage-energized rectifier 12 is reflected in an opposite-potential unidirectional-current impulse which flows through the rectifier 17, and is blocked by the rectifier 18 so that it does not flow through the restraint-winding 7. In this manner, the sensitivity of the differential relay 2 is not reduced in the event of the occurrence of a fault within the transformer 1 while it is in normal operation.

The differential relay 2 is provided with contacts 19 and 20 which may be utilized to energize the trip-coils 21 and 22 of two circuit-breakers 23 and 24 in the respective primary and secondary circuits or lines of the protected transformer 1.

While I have illustrated my invention in a preferred form of embodiment, and have described it in accordance with my best present understanding of its design-principles and limitations, I wish it to be understood that my invention is not by any means limited to one particular form of embodiment, and it may not be limited to my present understanding and appreciation thereof. I desire, therefore, that the appended claims shall be accorded the broadest construction consistent with their language.

I claim as my invention:

1. Protective relaying equipment for an alternating-current electrical apparatus of a type which is subject to transient fault-simulating conditions when the apparatus is unfaulted, said relaying equipment comprising the combination, with the protected apparatus, of a fault-responsive relay having electrical energizing-means for rendering it responsive to a fault-condition in the protected apparatus, and transient restraint-means associated with said relay for restraining a fault-indicating response of the relay, said transient restraint-means comprising a full-wave voltage-responsive rectifying-means, means for energizing said voltage-responsive rectifying-means from a voltage of the protected apparatus, means energized by the voltage-responsive rectifying-means for producing a segregated voltage which is responsive to sudden changes in the apparatus-voltage, a restraint-winding on said fault-responsive relay, and circuit-means for applying said segregated voltage to said restraint-winding.

2. The invention as defined in claim 1, characterized by said restraint-winding circuit-means including polarity-selective means for causing said restraint-winding to develop a stronger restraining-force when said segregated voltage has a polarity corresponding to an increase in the apparatus-voltage than when said segregated voltage has the opposite polarity.

3. The invention as defined in claim 1, in combination with polarity-selecting rectifying-means in the restraint-winding circuit for causing the restraint-winding to be responsive to the segregated voltage only when the current produced by said segregated voltage is in a single predetermined direction.

4. Protective relaying equipment for an alternating-current electrical apparatus of a type which is subject to transient fault-simulating conditions when the apparatus is unfaulted, said relaying equipment comprising the combination, with the protected apparatus and its fault-responsive relay, of transiently operative suppressor-means for rendering said fault-responsive relay relatively ineffective, said suppressor-means comprising a full-wave voltage-responsive rectifying-means, means for energizing said voltage-responsive rectifying-means from a voltage of the protected apparatus, means energized by the voltage-responsive rectifying-means for producing a segregated voltage which is responsive to sudden changes in the apparatus-voltage, and means responsive to said segregated voltage for rendering said fault-responsive relay relatively ineffective.

5. Protective relaying equipment for an alternating-current electrical apparatus of a type which is subject to transient fault-simulating conditions when the apparatus is unfaulted, said relaying equipment comprising the combination, with the protected apparatus and its fault-responsive relay, of transiently operative suppressor-means for rendering said fault-responsive relay relatively ineffective, said suppressor-means comprising a full-wave voltage-responsive rectifying-means, means for energizing said voltage-responsive rectifying-means from a voltage of the protected apparatus, means energized by the voltage-responsive rectifying-means for producing a segregated voltage which is responsive to sudden changes in the apparatus-voltage, and polarity-selective means responsive to said segregated voltage for rendering said fault-responsive relay relatively ineffective, said polarity-selective means being selectively responsive to current flowing in only one direction.

6. Protective relaying equipment for an alternating-current electrical apparatus of a type which is subject to transient fault-simulating conditions when the apparatus is unfaulted, said relaying equipment comprising the combination, with the protected apparatus and its fault-responsive relay, of transiently operative suppressor-means for rendering said fault-responsive relay relatively ineffective, said suppressor-means comprising a full-wave voltage-responsive rectifying-means, means for energizing said voltage-responsive rectifying-means from a voltage of the protected apparatus, means energized by the voltage-responsive rectifying-means for producing a segregated voltage which is responsive to sudden changes in the apparatus-voltage, a polarity-selecting rectifying-means, means for applying said segregated voltage to said polarity-selecting rectifying-means, and means responsive to said polarity-selecting rectifying-means for rendering said fault-responsive relay relatively ineffective.

7. Differential relaying equipment for an electrical transformer, comprising the combination, with said transformer and its differential relay, of transiently operative suppressor-means for rendering said differential relay relatively ineffective in response to the rate of change of a rectified voltage of the protected transformer, said suppressor-means comprising a full-wave voltage-responsive rectifying-means, means for energizing said voltage-responsive rectifying-means from a voltage of the protected transformer, and means energized by the voltage-responsive rectifying-means for producing a segregated voltage which is responsive to sudden changes in the transformer-voltage.

8. Differential relaying equipment for an electrical transformer, comprising the combination, with said transformer and its differential relay, of transiently operative suppressor-means for rendering said differential relay relatively ineffective in response to the rate of change of a rectified voltage of the protected transformer, suppressor-means comprising a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive means for rendering said differential relay relatively ineffective in response to said segregated voltage when the transformer-voltage suddenly increases.

9. Differential relaying equipment for an electrical transformer, comprising the combination, with said transformer and its differential relay, of transiently operative suppressor-means for rendering said differential relay relatively ineffective in response to the rate of change of a rectified voltage of the protected transformer, said suppressor-means comprising a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive rectifying-means energized by said segregated voltage for permitting a suppression-producing current-flow, only when the transformer-voltage suddenly increases.

10. A transformer differential relay having operating-means which is responsive to the difference between the input and output currents of the protected transformer, and a restraining means which is responsive to the rate of change of a rectified voltage of the protected transformer, said restraining-means including a full-wave voltage-responsive rectifying-means, means for energizing said voltage-responsive rectifying-means from a voltage of the protected transformer, and means energized by the voltage-responsive rectifying-means for producing a segregated voltage which is response to sudden changes in the transformer-voltage.

11. A transformer differential relay having operating-means which is responsive to the difference between the input and output currents of the protected transformer, and a restraining means which is responsive to the rate of change of a rectified voltage of the protected transformer, said restraining-means including a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive means for developing a restraining force in said differential relay in response to said segregated voltage when the transformer-voltage suddenly increases.

12. A transformer differential relay having operating-means which is responsive to the difference between the input and output currents of the protected transformer, and a restraining means which is responsive to the rate of change of a rectified voltage of the protected transformer, said restraining-means including a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive rectifying-means energized by said segregated voltage for maintaining a relay-restraining current-flow, only when the transformer-voltage suddenly increases.

13. A ratio-differential relay for protecting a power-transformer, said relay comprising operating-means which is responsive to the difference between the input and output currents of the protected transformer, restraining-means which is responsive to a current or currents in the protected transformer, and supplementary restraining-means which is responsive to the rate of change of a rectified voltage of the protected transformer, said supplementary restraining-means including a full-wave voltage-responsive rectifying-means, means for energizing said voltage-responsive rectifying-means from a voltage of the protected transformer, and means energized by the voltage-responsive rectifying-means for producing a segregated voltage which is responsive to sudden changes in the transformer-voltage.

14. A ratio-differential relay for protecting a power-transformer, said relay comprising operating-means which is responsive to the difference between the input and output currents of the protected transformer, restraining-means which is responsive to a current or currents in the protected transformer, and supplementary restraining-means which is responsive to the rate of change of a rectified voltage of the protected transformer, said supplementary restraining-means including a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive means for developing a restraining force in said differential relay in response to said segregated voltage when the transformer-voltage suddenly increases.

15. A ratio-differential relay for potecting a power-transformer, said relay comprising operating-means which is responsive to the difference between the input and output currents of the protected transformer, restraining-means which is responsive to a current or currents in the protected transformer, and supplementary restraining-means which is responsive to the rate of change of a rectified voltage of the protected transformer, said supplementary restraining-means including a full-wave voltage-responsive rectifying-means, means for energizing said voltage-responsive rectifying-means from a voltage of the protected transformer, means energized by the voltage-responsive rectifying-means for producing a segregated voltage which is responsive to sudden changes in the transformer-voltage, and polarity-responsive rectifying-means energized by said segregated voltage for maintaining a relay-restraining current-flow, only when the transformer-voltage suddenly increases.

ELMER G. RATZ.